US009369373B2

(12) United States Patent
Slupik et al.

(10) Patent No.: US 9,369,373 B2
(45) Date of Patent: Jun. 14, 2016

(54) PEER-TO-PEER BUILDING AUTOMATION SYSTEM WITHOUT KNOWLEDGE BEING REQUIRED OF NETWORK TOPOLOGY

(71) Applicant: Seed Labs Sp. z o.o., Cracow (PL)

(72) Inventors: Szymon Slupik, Cracow (PL); Maciej Witalinski, Jaworzno (PL)

(73) Assignee: Seed Labs Sp. z o.o. (PL)

( * ) Notice: Subject to any disclaimer, the term of this patent is extended or adjusted under 35 U.S.C. 154(b) by 0 days.

(21) Appl. No.: 14/467,407

(22) Filed: Aug. 25, 2014

(65) Prior Publication Data

US 2016/0057046 A1    Feb. 25, 2016

(51) Int. Cl.
| | |
|---|---|
| *H04W 4/00* | (2009.01) |
| *H04L 12/751* | (2013.01) |
| *H04L 12/707* | (2013.01) |
| *H04L 12/721* | (2013.01) |
| *H04L 12/741* | (2013.01) |
| *H04L 12/823* | (2013.01) |

(52) U.S. Cl.
CPC ............... *H04L 45/02* (2013.01); *H04L 45/24* (2013.01); *H04L 45/70* (2013.01); *H04L 45/74* (2013.01); *H04L 47/32* (2013.01); *H04W 4/005* (2013.01)

(58) Field of Classification Search
CPC ......... H04L 45/02; H04L 45/24; H04L 45/70; H04W 4/005
USPC .......................................................... 370/329
See application file for complete search history.

(56) References Cited

U.S. PATENT DOCUMENTS

| | | | |
|---|---|---|---|
| 2003/0040812 A1 | 2/2003 | Gonzales et al. | |
| 2003/0191793 A1* | 10/2003 | Dolin, Jr. ......... | G05B 19/41865 718/103 |
| 2006/0242295 A1* | 10/2006 | Husemann ......... | G06F 19/3481 709/224 |

OTHER PUBLICATIONS

"International Search Report and Written Opinion of the International Search Authority", dated Nov. 26, 2015, issued in counterpart International Patent Application No. PCT/US2015/046456.
Riccardo De Masellis et al, "Smart Home Planning Programs", "Service Systems and Service Management (ICSSSM), 2010 7th International Conference on," Jun. 28, 2010, pp. 1-6, vol. XP031718815, ISBN 978-1-4244-6485-2, Publisher: IEEE, Piscataway, NJ Published in: US.

* cited by examiner

*Primary Examiner* — Sai-Ming Chan
(74) *Attorney, Agent, or Firm* — Kaplan Breyer Schwarz & Ottesen LLP

(57) ABSTRACT

An automation system without any of the devices in the system being required to have knowledge of each other or of the topology of the network. The automation system comprises sensor nodes and actor nodes. The sensor nodes transmit information via a wireless network based on changes that are sensed by the sensors, such as a button being pushed or motion being detected. The actor nodes detect the information that is transmitted over the wireless network and control appliance functions based on the information detected. After the sensor and actor nodes are initialized, the sensor nodes transmit packets into the network based on changes that are detected in their environment. Meanwhile, the actor nodes monitor the network for packets that contain information of scenes that are relevant to each node. Based on the information contained in each such packet, the node acts on the information by controlling its appliance function.

30 Claims, 13 Drawing Sheets

100

PEER-TO-PEER BUILDING AUTOMATION SYSTEM WITHOUT KNOWLEDGE BEING REQUIRED OF NETWORK TOPOLOGY

FIELD OF THE INVENTION

The present invention relates to building automation and control in general, and, more particularly, to a peer-to-peer automation system that does not require knowledge of the topology of the network in which the peers communicate.

BACKGROUND OF THE INVENTION

Home automation refers to the use of computer and information technology to control home systems, such as lighting, HVAC, audio-visual, smoke detection, security, and shading, among others. Using specialized hardware, even household appliances can be monitored and controlled automatically. A feature of science fiction for many years, home automation has only recently become practical, both from a technological and cost perspective. This is due in part to the rapid advancement of information technology.

A sophisticated home automation system may include sensors (e.g., of temperature, of light, of motion, etc.), controllers (e.g., a general-purpose personal computer, a dedicated automation controller, etc.), and actuators (e.g., motorized valves, switches, etc.). The system may also include a human-machine interface device that enables a resident of the home to interact with the system. The interface can be a specialized terminal or an application ("app") running on a smart phone or tablet computer. The various system devices communicate over dedicated wiring, or over a wired network, or wirelessly, using one or more protocols.

FIG. 1 depicts home automation system 100 in the prior art. System 100 comprises: sensor nodes 101-1 through 101-G, wherein G is a positive integer; actor nodes 102-1 through 102-H, wherein H is a positive integer; and controller 110. The aforementioned elements are logically interconnected as shown.

Sensor nodes 101-1 through 101-G include one or more of: motion sensors, temperature sensors, light sensors, and air quality sensors. Actor nodes 102-1 through 102-H are home appliances that include one or more of: lamps, possibly with adjustable brightness and/or color; window blinds that can be opened and closed; and HVAC (heating, ventilation, and air conditioning) systems. Using such sensor and actor nodes, home automation system 100 is capable of triggering and acting on certain conditions as a function of sensor readings, such as turning on lights when motion is detected or when ambient light is low, controlling HVAC systems in response to temperature variations, and so forth. Controller 110 coordinates and executes the actions to be taken by one or more of the actor nodes, based on i) the input signals received from one or more of the sensor nodes and ii) one or more memorized states.

The simplest form of controlling an actor node is turning it on or off. The situation, however, gets more complicated where there are many appliances to control and where the controlling the appliances requires setting more than two (i.e., "on" or "off") states, such as adjusting the brightness of a lamp or the color of a lamp, or both. Indeed, where there are multiple lamps in a room, each with a dimmer, controlling them individually is not convenient.

To simplify the control of a group of nodes in a given space, it is convenient to define presets for each appliance, associated with certain scenarios. Each such group of presets is sometimes referred to as a "scene", and the actor appliances participate in a scene. For example, there are three lamps with dimmers in a room. Four scenes are predefined: "television-watching", "reading", "dining", and "partying". A user conveniently engages one of the scenes, and, as a result, she does not have to select dimmer levels for each lamp every time.

Conventional implementations of scenes are based on a centralized controller, such as controller 110, in which the controller remembers the values of scene settings for each lamp and each scene. Engaging a scene means sending to each actor a setting, such as a power level in the case of each lamp. FIG. 2 depicts a message flow diagram in the prior art, featuring the sending of a setting to each of lamps 102-1 through 102-3, both of which are actor nodes. When controller 110 determines that the brightness of lamp 102-1 needs to be changed, the controller transmits message 201 specifically to lamp 102-1. Similarly, when controller 110 determines that the brightness of lamp 102-2 or 102-3 needs to be changed, based on the user selecting a scene, the controller transmits message 202 or 203 specifically to lamp 102-2 or 102-3, respectively. Later, when controller 110 determines that the brightness of lamp 102-2 needs to be changed again, based on the user selecting a different scene than before, the controller transmits message 204 specifically to lamp 102-2. In other words, a different message is required to be transmitted for each lamp and for each change in brightness.

SUMMARY OF THE INVENTION

One of the problems with the conventional implementations of scenes in a home automation system is that because each actor node needs to be accessed by a central controller, the controller needs to remember the values of scene settings for each actor and each scene. As more and more smart appliances are introduced into the home, requiring this knowledge of both the nodes in the network and the topology of the network becomes cumbersome and impractical. Furthermore, the presence of a controller can add to the cost of the automation system without necessarily offering any distinct advantages.

The present invention enables an automation system without requiring a central controller to control the system, and without any of the devices in the system being required to have knowledge of each other or of the topology of the network. The disclosed automation system comprises sensor nodes and actor nodes. The sensor nodes transmit information via a wireless network based on changes that are sensed by the sensors, such as a button being pushed or motion being detected. The actor nodes detect the information that is transmitted over the wireless network and control appliance functions based on the information detected.

Part of what enables such a system is a software application ("app") that is used for the initial configuring of the automation system. The software application can be executed on a mobile station, such as a smartphone. The configuring process results in the actor nodes being initialized with a set of parameter values associated with each scene, including a control value (e.g., a brightness level, a temperature, etc.) to be applied whenever an actor node or nodes detect a data packet that indicates a scene that is relevant to the detecting actor node.

After the sensor and actor nodes are initialized, the sensor nodes transmit packets into the network based on changes that are detected in their environment. The packets contain information that is relevant to the preconfigured scenes. The network itself is based on the Bluetooth Low Energy (BLE) protocol. Meanwhile, the actor nodes monitor the network for packets that contain information of scenes that are relevant to each node. Based on the information contained in each such packet, the node acts on the information by controlling its appliance function, such as a single-channel dimmer, a multi-channel color (RGB) dimmer, or a window-blind motor controller, for example and without limitation.

None of the sensor nodes or actor nodes knows, or needs to know, the topology of the network, including information about the nodes that are present. The packets themselves contain neither the sender's address nor the recipient's address, at least in some embodiments. The senders are unaware of which recipients will detect the packets and how they will act on them. The users of each packet are one or more of the actor nodes, wherein the combination of users of a given packet can vary from one transmitted packet to the next. Also, the recipients are unaware of which sensor node a given packet originated at, and there can be multiple sensor nodes concurrently transmitting packets into the network. In short, instead of being driven by addressing each individual node, the automation system disclosed herein is driven by sensor events, in the form of scene indications and the commands to be applied. Advantageously, such an automation system in which the nodes function without knowledge of the network's topology makes the system easier to configure and manage.

In order to describe how to make and use the disclosed system, this specification often refers to "scenes" (including in the foregoing), which are known in the art. However, it will be clear to those skilled in the art after reading this specification, how to make and use embodiments of the present invention in which something other than scenes are managed. For this reason, the generalized term of "composite" is used throughout this specification, of which a scene is but one example.

An illustrative method comprises: storing, by a first actor node, a first plurality of initialized tuples into a memory, each initialized tuple comprising a composite indication, wherein at least some of the composite indications in the first plurality are also stored into a memory by a second actor node that is physically distinct from the first actor node; monitoring, by the first actor node, a plurality of wirelessly-transmitted packets for one or more tuples in the first plurality of initialized tuples, wherein the transmitted packets originate at one or more sensor nodes, and wherein each packet comprises a transmitted tuple; discarding, by the first actor node, a packet in the plurality of transmitted packets being monitored, as a result of the transmitted tuple in the packet corresponding to a tuple that has been already acted upon by the first actor node; and acting, by the first actor node, on the transmitted tuple in a packet that is undiscarded by the first actor node; wherein the acting occurs without the first actor node being addressed by and without the first actor node addressing the second actor node or the one or more sensor nodes.

Another illustrative method comprises: transmitting, by a configuring node, a first tuple to a first actor node and a second tuple to a second actor node, wherein each of the first and second tuple comprises a composite indication; storing, by the first actor node, a first plurality of initialized tuples comprising the first tuple; storing, by the second actor node, a second plurality of initialized tuples comprising the second tuple; monitoring, by the first and second actor nodes, a plurality of wirelessly-transmitted packets, wherein the transmitted packets originate at one or more sensor nodes, and wherein each packet comprises a transmitted tuple; discarding, by at least one of the first and second actor nodes, one or more packets in the plurality of transmitted packets, as a result of the transmitted tuples in the one or more packets corresponding to tuples that have been already acted upon by the corresponding first or second actor node performing the discarding; and acting, by the first actor node, on the transmitted tuple in a packet that is undiscarded by the first actor node; wherein the acting occurs without the first actor node being addressed by and without the first actor node addressing the second actor node or the one or more sensor nodes.

An illustrative system comprises a first actor node, the first actor node comprising:
  a memory configured to store a first plurality of initialized tuples, each initialized tuple comprising a composite indication, wherein at least some of the composite indications in the first plurality are also stored in a memory of a second actor node that is physically distinct from the first actor node;
  a receiver configured to monitor a plurality of wirelessly-transmitted packets for one or more tuples in the first plurality of initialized tuples, wherein the transmitted packets originate at one or more sensor nodes, and wherein each packet comprises a transmitted tuple; and
  a processor configured to:
    i) discard a packet in the plurality of transmitted packets being monitored, as a result of the transmitted tuple in the packet corresponding to a tuple that has been already acted upon by the first actor node, and
    ii) act on the transmitted tuple in a packet that is undiscarded by the first actor node, without the first actor node being addressed by and without the first actor node addressing the second actor node or the one or more sensor nodes.

Another illustrative system comprises:
  a configuring node configured to transmit a first tuple to a first actor node and a second tuple to a second actor node, wherein each of the first and second tuple comprises a composite indication;
  the first actor node, configured to store a first plurality of initialized tuples comprising the first tuple;
  the second actor node, configured to store a second plurality of initialized tuples comprising the second tuple;
  wherein the first and second actor nodes are each configured to monitor a plurality of wirelessly-transmitted packets, wherein the transmitted packets originate at one or more sensor nodes, and wherein each packet comprises a transmitted tuple;
  wherein at least one of the first and second actor nodes is configured to discard one or more packets in the plurality of transmitted packets, as a result of the transmitted tuples in the one or more packets corresponding to tuples that have been already acted upon by the corresponding first or second actor node performing the discarding; and
  wherein the first actor node is configured to act on the transmitted tuple in a packet that is undiscarded by the first actor node, without the first actor node being addressed by and without the first actor node addressing the second actor node or the one or more sensor nodes.

DETAILED DESCRIPTION

Figure 1:
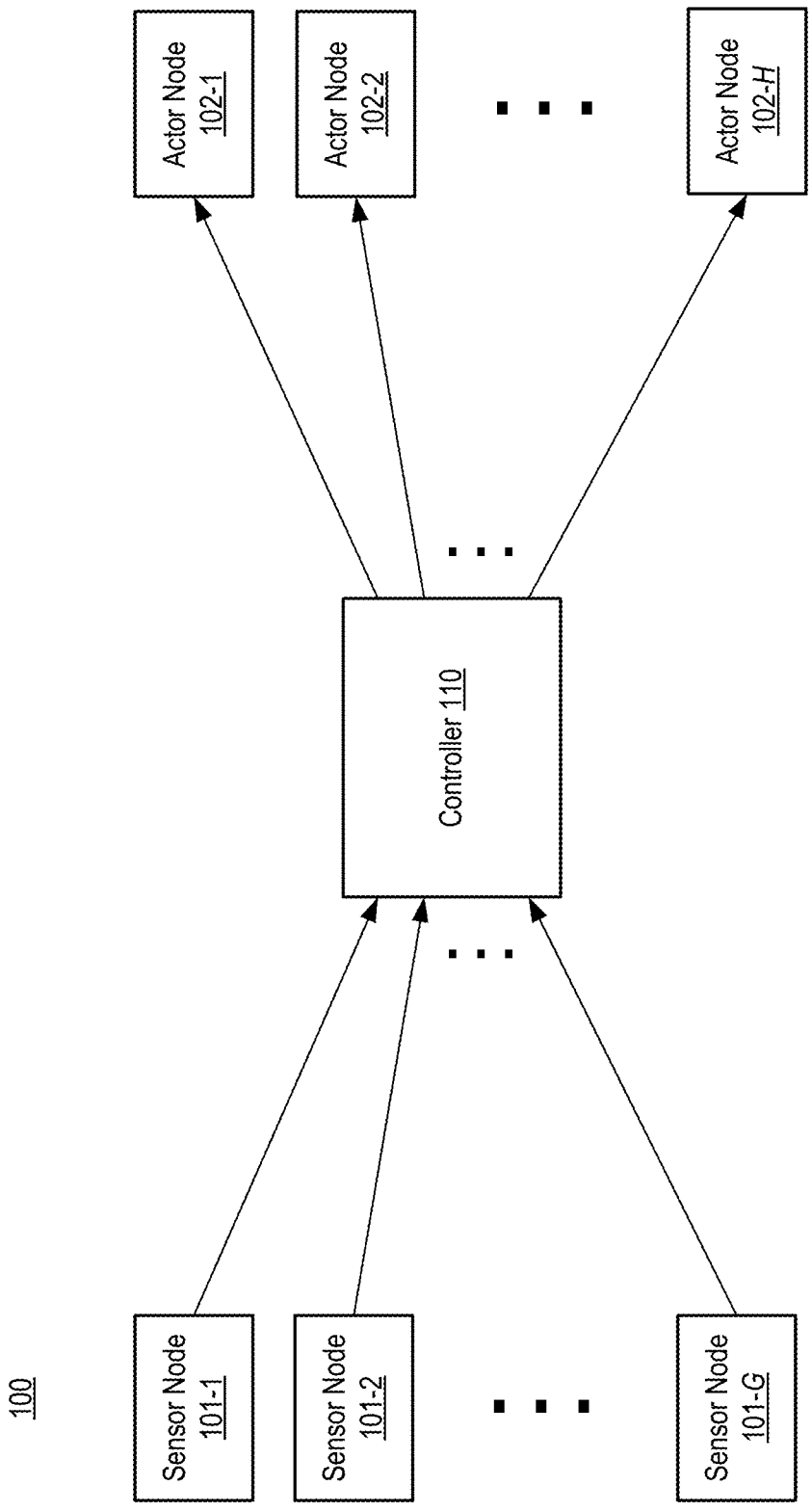
FIG. 1 depicts home automation system 100 in the prior art.
Figure 2:
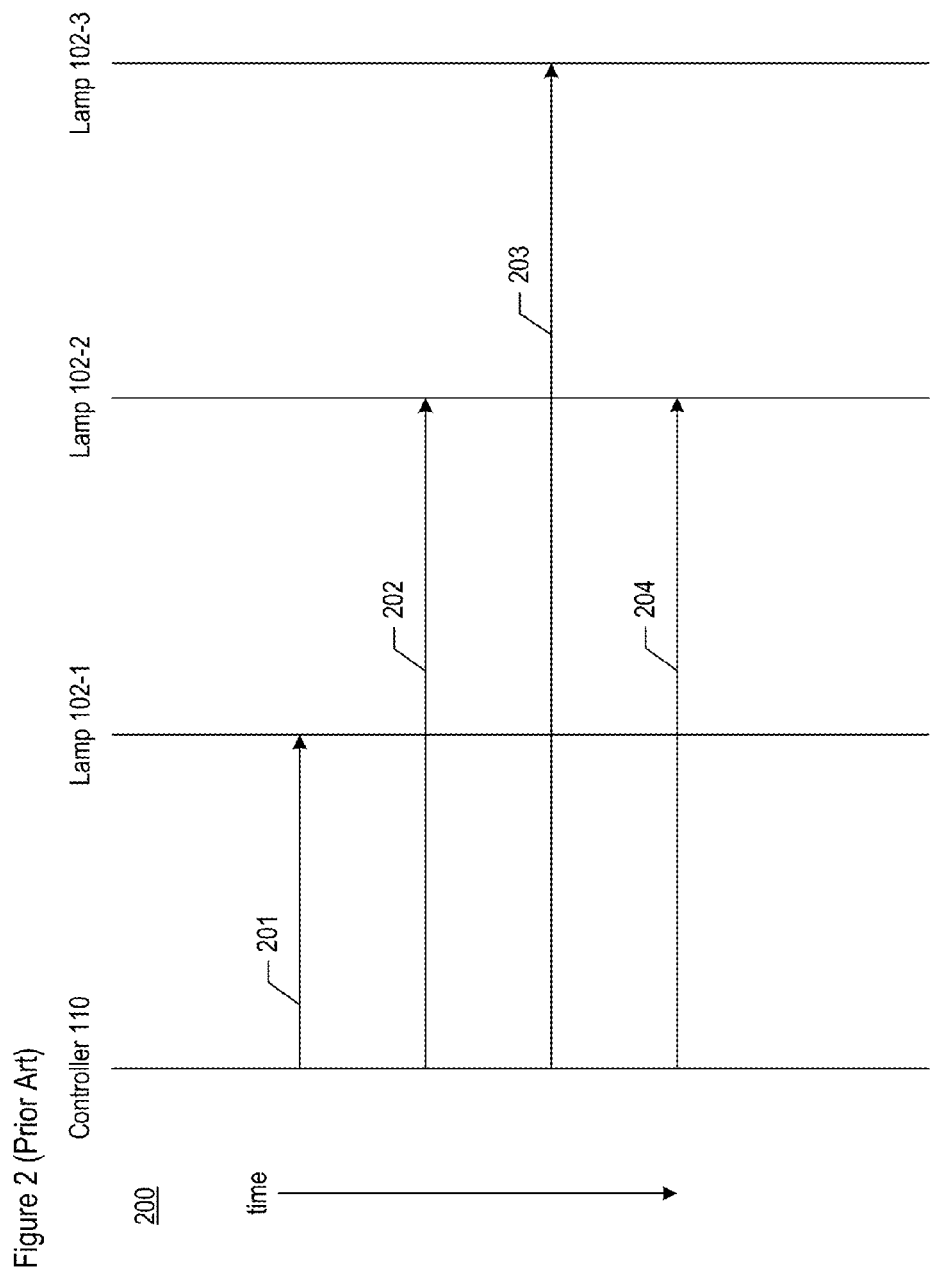
FIG. 2 a message flow diagram in the prior art, depicting the sending of a setting to each of lamps 102-1 through 102-3, which are actor nodes.
Figure 3:
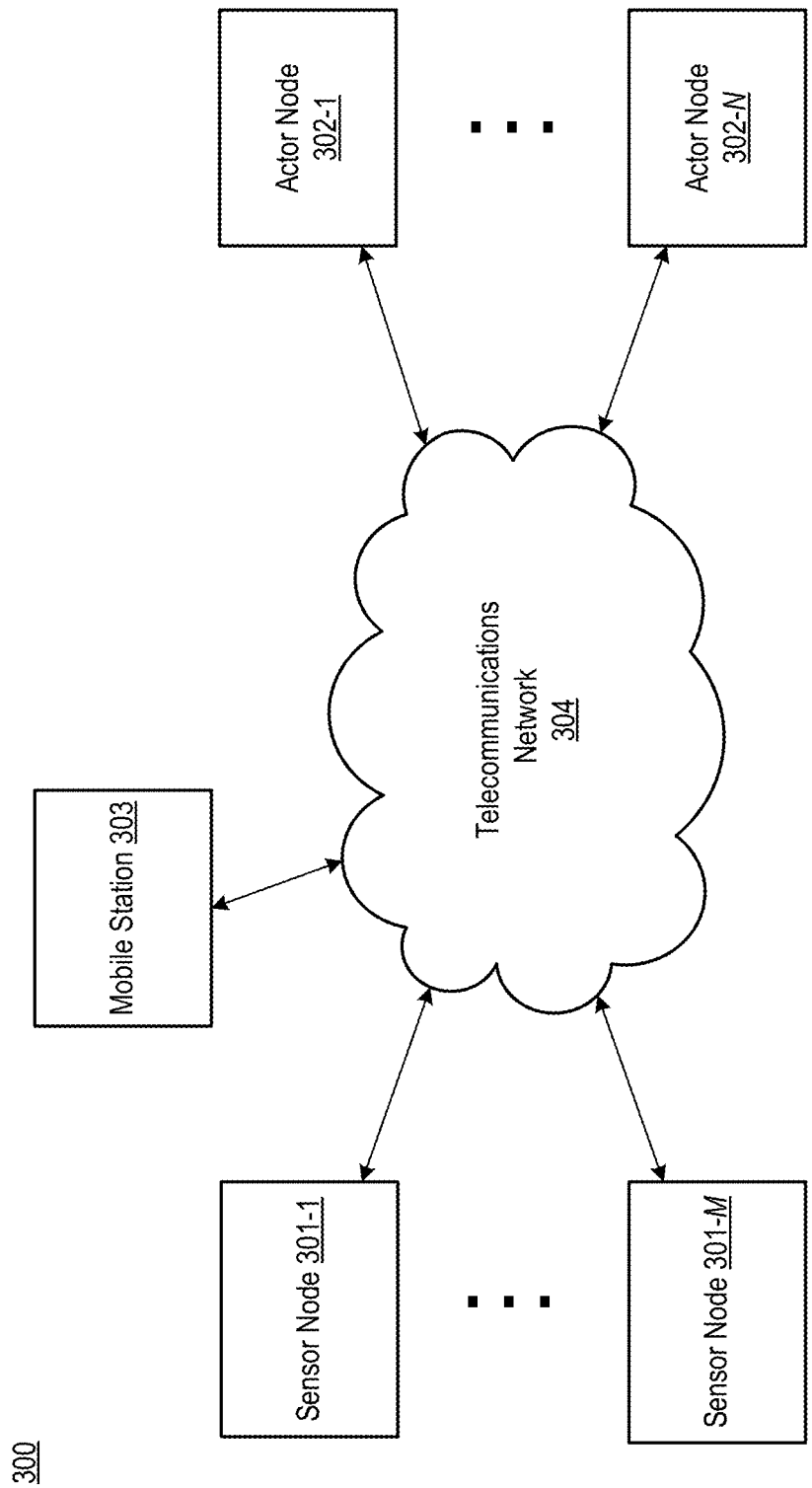
FIG. 3 depicts automation system 300, in accordance with an illustrative embodiment of the present invention.

FIG. 3 depicts automation system 300, in accordance with an illustrative embodiment of the present invention. System 300 comprises: sensor nodes 301-1 through 303-M, wherein M is a positive integer; actor nodes 302-1 through 302-N, wherein N is a positive integer; mobile station 303; and telecommunications network 304. The aforementioned elements are interconnected as shown and, as depicted, are physically distinct devices with respect to one another.

In accordance with an illustrative embodiment of the present invention, automation system 300 is an automation and control system in the home. As those who are skilled in the art will appreciate after reading this specification, however, automation system 300 can be applied to any type of building, including the environment surrounding the building, or to any environment in which automated control can be applied.

Sensor node 301-$m$, wherein m has a value between 1 and M, inclusive, is an apparatus that comprises memory, processing components, and communication components. Sensor node 301-$m$ is configured to transmit signals providing sensor-related information. Sensor node 301-$m$ is described in detail below and in FIG. 4.

Actor node 302-$n$, wherein n has a value between 1 and N, inclusive, is an apparatus (e.g., a smart appliance, etc.) that comprises memory, processing components, and communication components. Actor node 302-$n$ is configured to receive signals that the node uses to control corresponding appliance functions and/or affect a condition, physical or otherwise, in the node's environment. Actor node 302-$n$ is described in detail below and in FIG. 5.

In some embodiments, at least one of the sensor nodes and/or actor nodes is configured to both i) transmit signals providing sensor-related information and ii) receive signals that the node uses to control corresponding appliance functions and/or affect a condition, physical or otherwise, in the node's environment.

Mobile station 303 is a wireless telecommunications terminal that is configured to transmit and/or receive communications wirelessly. It is an apparatus that comprises memory, processing components, and communication components. Mobile station 303 comprises the hardware and software necessary to be compliant with the protocol standards used in the wireless network in which it operates and to perform the processes described below and in the accompanying figures. Mobile station 303 is described in detail below and in FIG. 6.

Furthermore, mobile station 303 is illustratively a smartphone with at least packet data capability provided and supported by the network in which it operates and that is configured to execute a software application (e.g., an "app") for controlling and/or configuring one or more of the other devices depicted in FIG. 3. In some alternative embodiments of the present invention, mobile station 303 can be referred to by a variety of alternative names such as a wireless transmit/receive unit (WTRU), a user equipment (UE), a wireless terminal, cell phone, or a fixed or mobile subscriber unit, or can be any other type of device that is capable of operating in a wireless network environment, mobility-oriented or otherwise.

Telecommunications network 304 is a wireless personal area network (WPAN) that provides the elements of system 300 with connectivity to one other. In accordance with an illustrative embodiment of the present invention, network 304 comprises a communications medium for transmitting packets of data in accordance with the Bluetooth Low Energy (BLE) protocol. In some other embodiments of the present invention, telecommunications network 304 is another type of WPAN (e.g., Z-Wave, ZigBee, Wi-Fi, classic Bluetooth, etc.). As those with ordinary skill in the art will appreciate after reading this disclosure, in some embodiments of the present invention network 304 can comprise one or more of the above-mentioned networks and/or other telecommunications networks, without limitation. Furthermore, as those with ordinary skill in the art will appreciate after reading this disclosure, telecommunications network 304 can comprise elements that are capable of wired and/or wireless communication, without limitation.

Figure 4:
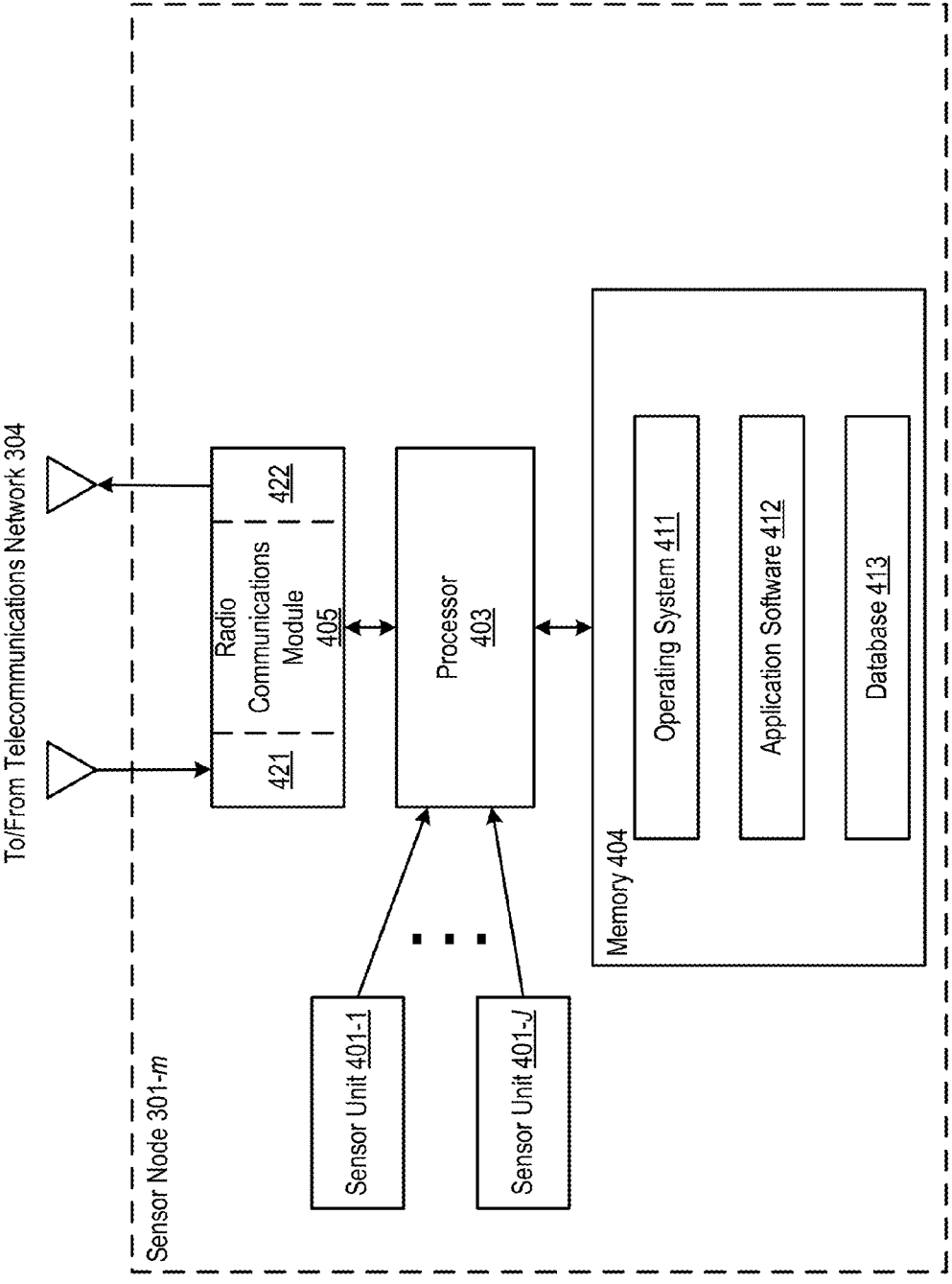
FIG. 4 depicts the salient components of sensor node 301-*m* of system 300.

FIG. 4 depicts the salient components of sensor node 301-$m$ according to an illustrative embodiment of the present invention. Sensor node 301-$m$ is based on a data-processing apparatus whose hardware platform comprises: sensor unit 401-1 through 401-J, wherein J is a positive integer; processor 403, memory 404, and radio communications module 405, interconnected as shown. In some alternative embodiments, there can also be one or more actor units present, which are described below and in FIG. 5.

Sensor unit 401-$j$, wherein j has a value between 1 and J, inclusive, is an apparatus that comprises memory, processing components, and communication components, and is configured to gathers information about the environment that is accessible by the sensor unit. Each sensor unit generates an "event" based on a state change as a result of an external event occurring (e.g., pushbutton pressed, motion detected, etc.) or an internal event occurring (e.g., a counter reaching a particular value, etc.). For example and without limitation, a sensor unit autonomously generates events based on a state change of one or more of the following, in any combination:

i. environmental probes (e.g., temperature, ambient light, motion, humidity, etc.).
  ii. electrical inputs (i.e., binary, analog, bus).
  iii. signals received via radio (e.g., proximity beacons, etc.).
  iv. a state of the internal logic, woken up periodically based on time or on an external event.

As those who are skilled in the art will appreciate, after reading this disclosure, sensor unit 401-$j$ can generate events based on different criteria than those listed above.

Processor 403 is a processing device, such as a microprocessor that is well known in the art. Processor 403 is configured such that, when operating in conjunction with the other components of sensor node 301-$m$, processor 403 executes software, processes data, and telecommunicates according to the operations described herein. In particular, processor 403 determines which parameter values are to be included in packets to be transmitted, based on i) the events generated by the one or more sensor units and ii) associations between each event and the parameter values, as described below. The parameter values, which can include a "composite indication" and a "command indication", for example, are described in detail below and in FIG. 7 and higher. Processor 403 also composes data packets that comprise the relevant parameter values.

Memory 404 is non-transitory and non-volatile computer storage memory technology that is well known in the art (e.g., flash memory, etc.). Memory 404 is configured to store operating system 411, application software 412, and database 413. The operating system is a collection of software that manages, in well-known fashion, sensor node 301-$m$'s hardware resources and provides common services for computer programs, such as those that constitute the application software. The application software that is executed by processor 403 according to an illustrative embodiment enables sensor node 301-$m$ to perform the functions disclosed herein. Database 413 comprises information about each possible event and associated parameter values.

It will be clear to those having ordinary skill in the art how to make and use alternative embodiments that comprise more than one memory 404; or comprise subdivided segments of memory 404; or comprise a plurality of memory technologies that collectively store the operating system, application software, and database.

Radio communications module 405 is configured to enable sensor node 301-$m$ to telecommunicate with other devices and systems, by receiving signals therefrom and/or transmitting signals thereto via receiver 421 and transmitter 422, respectively. For example, radio communications module 405 communicates with mobile station 303 and transmits data packets that can be used by one or more of actor nodes 302-1 through 302-$n$. Radio communications module 405 communicates via Bluetooth Low Energy (BLE). In some other embodiments, radio communications module 405 communicates via one or more other radio telecommunications protocols other than or in addition to BLE such as, but not limited to, Z-Wave, ZigBee, Wi-Fi, classic Bluetooth, and so on.

Receiver 421 is a component that enables sensor node 301-$m$ to telecommunicate with other components and systems by receiving signals that convey information therefrom. It will be clear to those having ordinary skill in the art how to make and use alternative embodiments that comprise more than one receiver 421.

Transmitter 422 is a component that enables sensor node 301-$m$ to telecommunicate with other components and systems by transmitting signals that convey information thereto. For example and without limitation, transmitter 422 is configured to transmit packets comprising the parameter values mentioned earlier. It will be clear to those having ordinary skill in the art how to make and use alternative embodiments that comprise more than one transmitter 422.

In accordance with an illustrative embodiment, sensor node 301-$m$ uses radio communications module 405 in order to telecommunicate wirelessly with external devices. It will clear to those skilled in the art, however, after reading the present disclosure, how to make use and use various embodiments of the present invention in which sensor node 301-$m$ communicates via a wired protocol (e.g., X10, KNX, etc.) over physical media (e.g., cable, wire, etc.) with one or more external devices, either in addition to or instead of the wireless capability provided by radio communications module 405.

Figure 5:
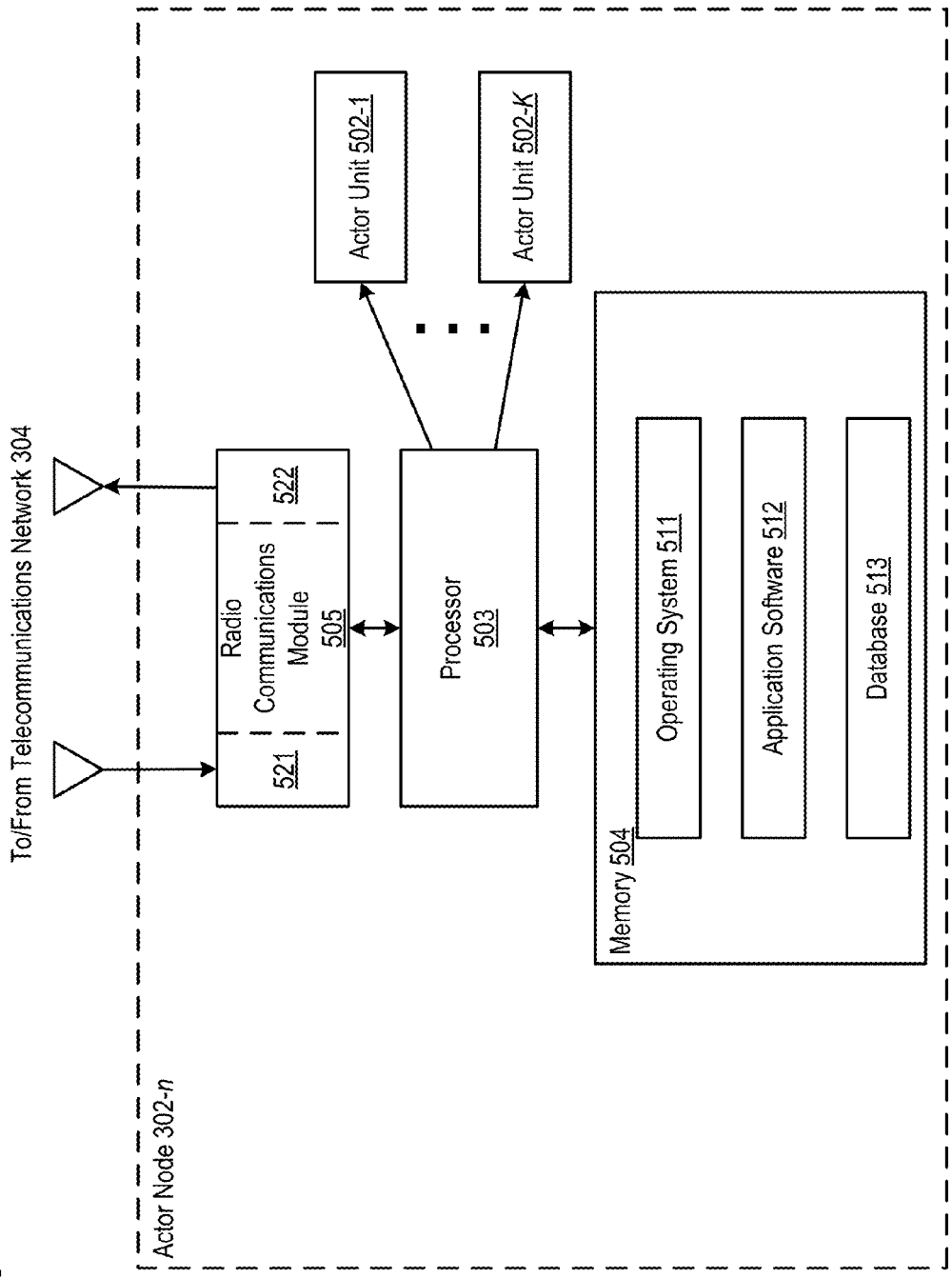
FIG. 5 depicts the salient components of actor node 302-*n* of system 300.

FIG. 5 depicts the salient components of actor node 302-$n$ according to an illustrative embodiment of the present invention. Actor node 302-$n$ is based on a data-processing apparatus whose hardware platform comprises: actor unit 502-1 through 502-K, wherein K is a positive integer; processor 503, memory 504, and radio communications module 505, interconnected as shown. In some alternative embodiments, there can also be one or more sensor units present, which are described above and in FIG. 4.

Actor unit 502-$k$, wherein k has a value between 1 and K, inclusive, is an apparatus that comprises memory, processing components, and communication components, and is capable of doing something in the course of being affected by signals (e.g., data packets, etc.) originating externally to the actor component, such as from one or more of sensor nodes 301-1 through 301-M, as described in detail below. Each actor unit 502-$k$ takes decisions that are based on signals from one or more sources and performs appropriate actions upon the actor's environment. Each actor unit acts upon its environment in well-known fashion. In some embodiments, an actor unit is or comprises an actuator, as is known in the art.

Actor unit 502-$k$ is configured to receive, transmit, process, and/or relay signals conveying data, as well as being configured to affect a condition, physical or otherwise, in its environment. For example and without limitation, the condition being affected can be:

i. lighting, which can be adjusted (e.g., turning on or off, changing brightness, changing color or mood, displaying a picture or pattern, etc.).

ii. sound, which can be adjusted (e.g., increasing or decreasing volume, changing playlist or mood, turning on/off, selecting signal source, etc.).

iii. room climate, which can be controlled (e.g., increasing or decreasing temperature, humidity, air fragrance, etc.).

iv. an alert, which can be generated (e.g., of an email, of an SMS message, etc.).

v. monitoring by a camera, which can be panned or tilted.

vi. home entertainment/home cinema settings (e.g., selecting one or more of signal source, streaming application, multimedia to play, audio language, subtitles, chapter, play/pause/stop, rewind/fast forward, etc.).

vii. connected/smart TV features (e.g., selecting application to be launched, navigating through on-screen menus, etc.).

viii. virtual keyboard—navigation on virtual keyboard displayed by other device (e.g., TV, set-top box, etc.).

ix. control of shades/window coverings/blinds.

x. access control (e.g., unlocking/locking doors, opening/shutting doors, authorizing access to selected rooms or zones, etc.).

As those who are skilled in the art will appreciate, after reading this disclosure, actor unit 502-$k$ can provide a different function than those described above. Furthermore, actor node 302-$n$ can comprise any combination of and any number of actor functions. As those who are skilled in the art will appreciate, after reading this disclosure, actor node 302-$n$ comprising one or more actor functions can be in a variety of forms, such as a light bulb as part of a lighting system, a media player as part of an audio/video system, a heater as part of an environment control system, an outgoing-email server as part of a messaging system, an actor in a water sprinkler system, a robot or robotic arm, a pan/tilt camera, a switch, a motor, a servo mechanism, and so on.

Processor 503 is a processing device that is similar to processor 403. Processor 503 determines which packets are to be processed and how each processed packet is to be used, in part based on the parameter values (e.g., composite indication, command indication, etc.) contained in each packet.

Memory 504 is non-transitory and non-volatile computer storage memory technology that is well known in the art (e.g., flash memory, etc.) and is similar to memory 404. Memory 504 is configured to store operating system 511, application software 512, and database 513. The operating system is a collection of software that manages, in well-known fashion, actor node 302-n's hardware resources and provides common services for computer programs, such as those that constitute the application software. The application software that is executed by processor 503 according to an illustrative embodiment enables actor node 302-n to perform the functions disclosed herein. Database 513 comprises information about each relevant parameter value, as described below.

Radio communications module 505 is configured to enable actor node 302-n to telecommunicate with other devices and systems, by receiving signals therefrom and/or transmitting signals thereto via receiver 521 and transmitter 522, respectively. Receiver 521 and transmitter 522 are similar to receiver 421 and transmitter 521, respectively. Radio communications module 505 communicates with mobile station 303 and detects data packets that are transmitted by one or more of sensor nodes 301-1 through 301-M. Radio communications module 505 communicates via Bluetooth Low Energy (BLE).

Figure 6:
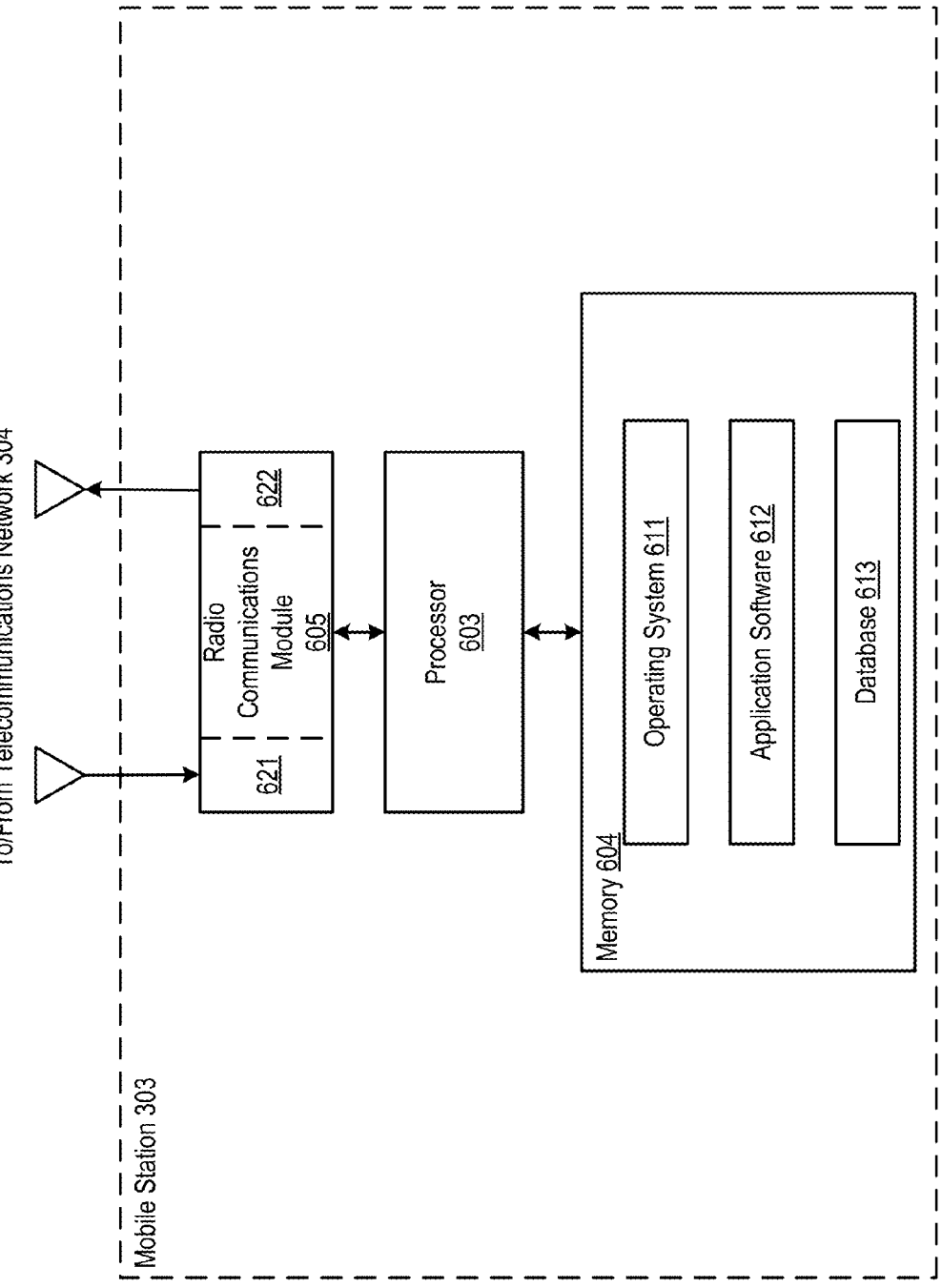
FIG. 6 depicts the salient components of mobile station 303 of system 300.

FIG. 6 depicts the salient components of mobile station 303 according to an illustrative embodiment of the present invention. Mobile station 303 is based on a data-processing apparatus whose hardware platform comprises: processor 603, memory 604, and radio communications module 605, interconnected as shown.

Processor 603 is a processing device that is similar to processor 403. For example, processor 603 determines which configuration messages are to be transmitted to which sensor nodes and actor nodes, as described below.

Memory 604 is non-transitory and non-volatile computer storage memory technology that is well known in the art (e.g., flash memory, etc.) and is similar to memory 404. Memory 604 is configured to store operating system 611, application software 612, and database 613. The operating system is a collection of software that manages, in well-known fashion, mobile station 303's hardware resources and provides common services for computer programs, such as those that constitute the application software. The application software that is executed by processor 603 according to an illustrative embodiment enables mobile station 303 to perform the functions disclosed herein. Database 613 comprises information about configuring each sensor node and actor node, as described below.

Radio communications module 605 is configured to enable mobile station 303 to telecommunicate with other devices and systems, by receiving signals therefrom and/or transmitting signals thereto via receiver 621 and transmitter 622, respectively. For example, radio communications module 605 communicates with sensor nodes 301-1 through 301-M and actor nodes 302-1 through 302-N. Radio communications module 605 communicates with the sensor and actor nodes via Bluetooth Low Energy (BLE) and communicates within the cellular network in accordance with a cellular protocol. In some other embodiments, radio communications module 605 communicates via one or more other radio telecommunications protocols.

Receiver 621 is a component that enables mobile station 303 to telecommunicate with other components and systems by receiving signals that convey information therefrom. It will be clear to those having ordinary skill in the art how to make and use alternative embodiments that comprise more than one receiver 621.

Transmitter 622 is a component that enables mobile station 303 to telecommunicate with other components and systems by transmitting signals that convey information thereto. It will be clear to those having ordinary skill in the art how to make and use alternative embodiments that comprise more than one transmitter 622.

Figure 7:
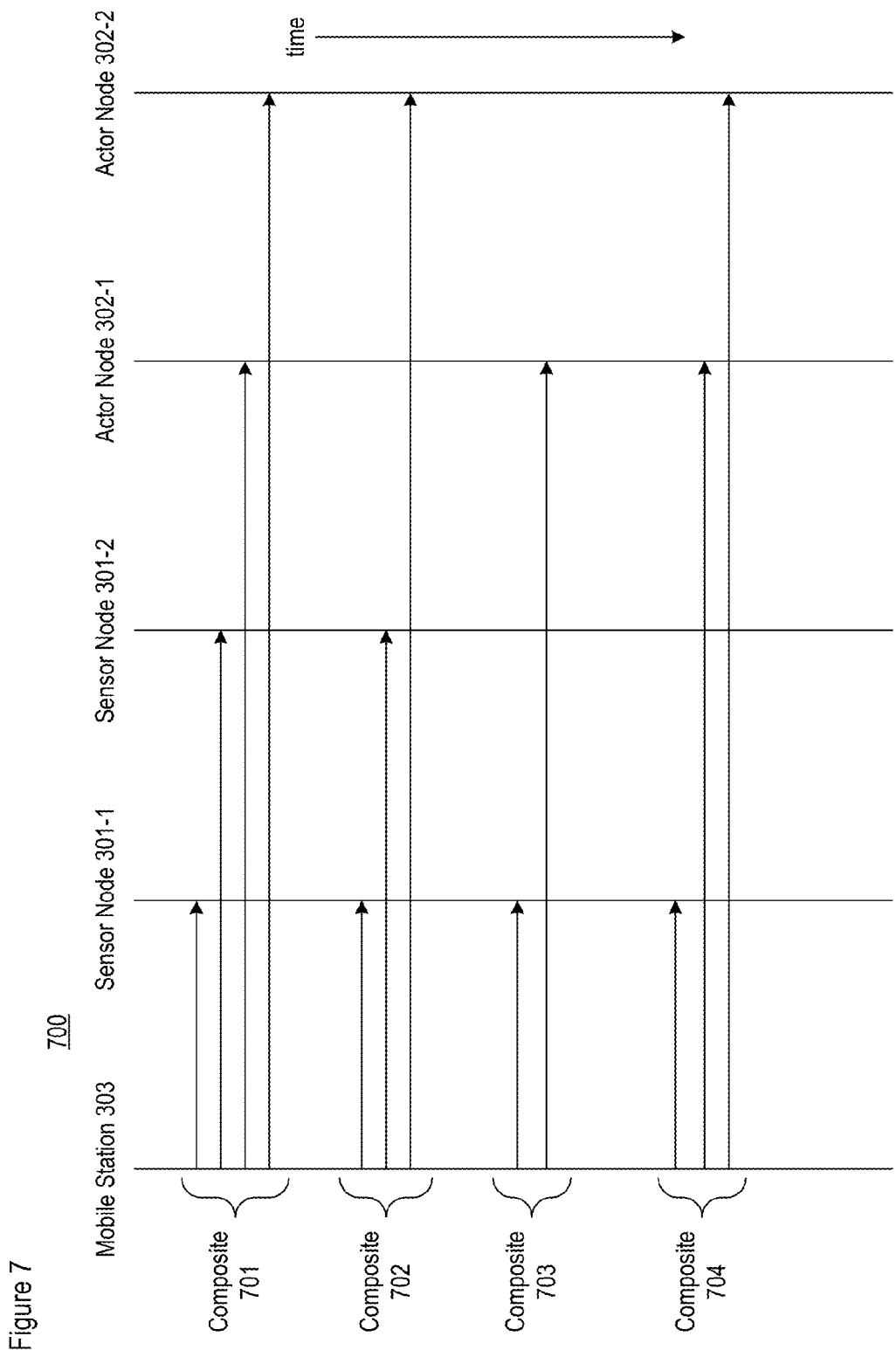
FIG. 7 depicts some salient operations of method 700, by which one or more of sensor nodes 301-1 through 301-M and actor nodes 302-1 through 302-N are configured.

Configuring the Sensor Nodes and Actor Nodes:

FIG. 7 depicts some salient operations of method 700 according to an illustrative embodiment of the present invention, by which one or more of sensor nodes 301-1 through 301-M and actor nodes 302-1 through 302-N are configured. As depicted, mobile station 303, by executing a smartphone application, is used to configure sensor nodes 301-1 and 301-2 and actor nodes 302-1 and 302-2. Two sensor nodes and two actor nodes are depicted; however, as those who are skilled in the art will appreciate after reading this specification, mobile station 303 can be used to configure any number of sensor nodes and actor nodes, and in any combination.

Mobile station 303 detects commands being typed by its user, who is using the smartphone application to configure his home automation system, and translates those commands into configuration information. The configuration information represents one or more "composites," each of which is something that is composed of separate parts. An example of a composite is a "scene," which is defined by a group of presets. To simplify control of a group of devices in a given space (e.g., a room, etc.), it is convenient to define presets for each appliance (e.g., a smart bulb, etc.), associated with certain scenarios. As those who are skilled in the art will appreciate after reading this specification, a composite is a generalization that can refer to a scene or to something else.

As discussed later in this specification, an intended effect associated with first defining and configuring, and then engaging a composite during run-time, is that the user of automation system 300 perceives a set of actor node appliances as adjusting in unison as part of the user-defined composite having been engaged. In accordance with the illustrative embodiment, this occurs without any direct communication, in the form of actor-specific addressing, or direct coordination, in the form of actor-specific commands, between the one or more sensor nodes involved and the one or more actor nodes involved. Furthermore, this effect relies on the proper information being initially configured for each user-defined composite, across the sensor and actor nodes involved in each defined composite.

As discussed above and in FIG. 4, each sensor node autonomously generates events based on a state change of one or more properties (e.g., ambient light, etc.). In order to properly translate such events into meaningful parameter values during run-time, during the configuration process involving method 700 selected events are associated with composites, which are identified by "composite indications," and commands, which are identified by "command indications." These composite indications and command indications are stored in memory in each configured sensor node. Notably, the composite indications and command indications can be different for each sensor node, depending on each particular sensor nodes involvement in a particular defined composite.

As discussed above and in FIG. 5, each actor node determines which packets are to be processed and how each processed packet is to be used, in part based on the parameter values (e.g., composite indication, command indication, etc.) contained in each packet. In order to properly translate such parameter values into the appropriate actions during run-time, during the configuration process involving method 700 the actor nodes each has a portion of memory (e.g., a set of registers, etc.) initialized, into which memory parameter values for the following are stored:

i. a composite indication.
ii. one of two possible composite modes—"exclusive" and "coexisting".
iii. a control value. The control value can be either one-dimensional or multi-dimensional; for example, it can represent one or more of a power level, a color, a window-blind position, etc.

As those who are skilled in the art will appreciate after reading this specification, the set of initialized parameters can be different than those listed above, in order to suit the particular implementation. For example, there can be a different number of possible composite modes, with different defined values than "exclusive" and "coexisting."

Referring to the specific example depicted in FIG. 7, mobile station 303 is configuring the depicted sensor and actor nodes to be able to handle four different composites: composites 701 through 704. Because each composite will have a different effect on the environment being controlled, each composite provides different parameter values to a different combination of sensor nodes and actor nodes. Composite 701 requires the initialization of all depicted nodes. Composite 702 requires the initialization of both sensor nodes and actor node 302-2 only. Composite 703 requires the initialization of sensor node 301-1 and actor node 302-1 only. And composite 704 requires the initialization of sensor node 301-1 only and both actor nodes.

As those who are skilled in the art will appreciate, after reading this specification, there are various implications in not having all nodes being initialized for all composites. As one example, sensor node 301-2 will not be involved in the enabling of composites 703 and 704 because these composites do not require sensor node 301-2's involvement. As another example, actor nodes 302-1 and 302-2 will not be involved in the enabling of composites 702 and 703, respectively, because these composites do not require the involvement of these actor nodes. Notably, one or more of the composite indications defined at mobile station 303 might be initialized in multiple actor nodes, while one or more of the composite indications might be initialized in only a single actor node.

In regard to method 700, as well as to the other methods depicted in the flowcharts and message flow diagrams contained herein, it will be clear to those having ordinary skill in the art, after reading the present disclosure, how to make and use alternative embodiments of the disclosed methods in which the recited operations, sub-operations, and messages are differently sequenced, grouped, or sub-divided—all within the scope of the present invention. It will be further clear to those skilled in the art, after reading the present disclosure, how to make and use alternative embodiments of the disclosed methods wherein some of the described operations, sub-operations, and messages are optional, are omitted, or are performed by other elements and/or systems.

Figure 8:
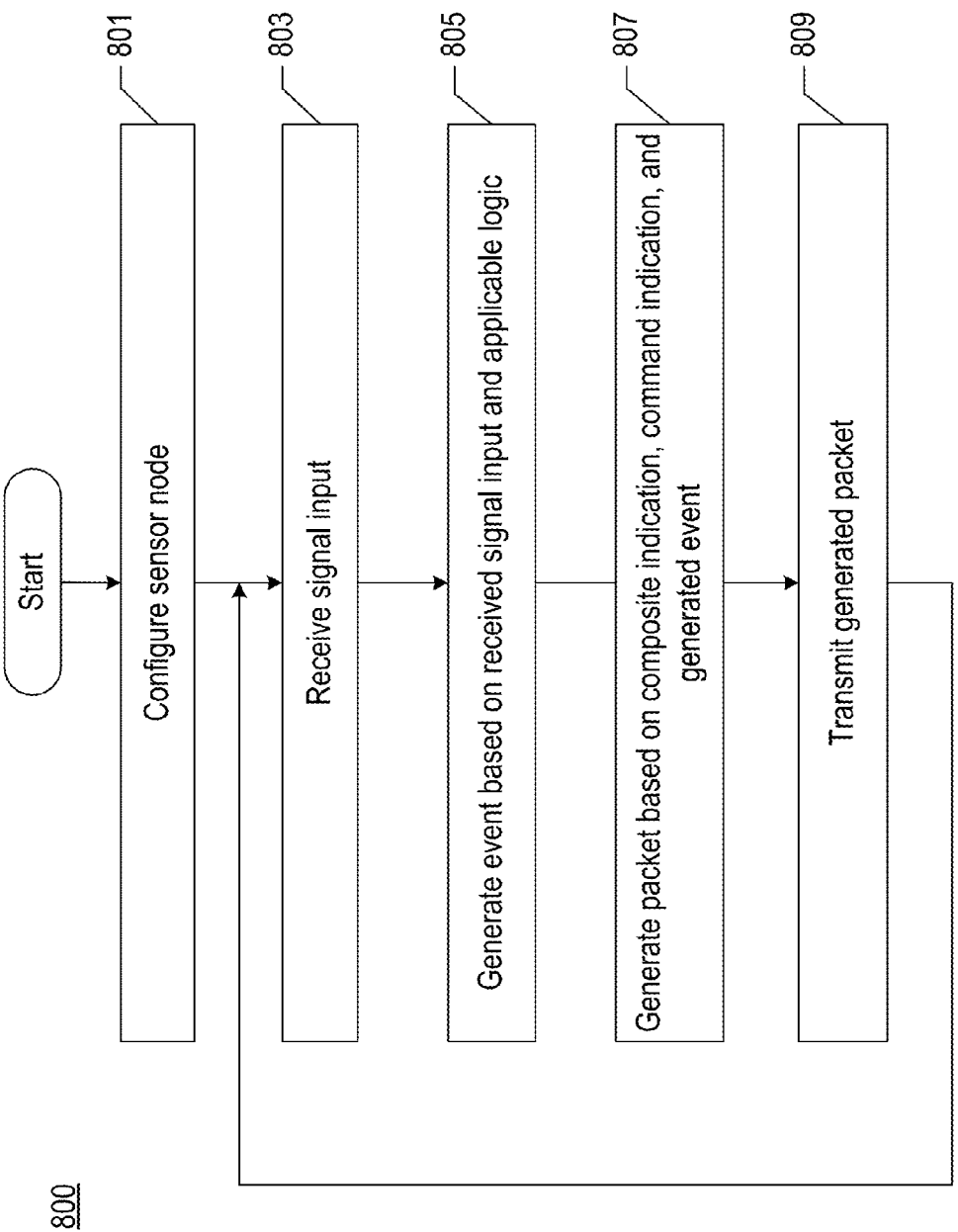
FIG. 8 depicts some salient operations of method 800, by which sensor node 301-1 performs various actions.

Operations of Sensor Node 301-m:

FIG. 8 Depicts Some Salient operations of method 800 according to an illustrative embodiment of the present invention, by which representative sensor node 301-1 performs various actions. In accordance with operation 801, sensor node 301-1 is configured as described above and in FIG. 7. Then, the node enters a run-time mode.

In accordance with operation 803, node 301-1 receives a signal of the physical condition being monitored (e.g., ambient lighting, etc.).

In accordance with operation 805, node 301-1 generates an event based on both the received signal and applicable logic.

In accordance with operation 807, node 301-1 generates a data packet containing the composite indication and command indication mapped to the particular generated event, based on the information configured in operation 801.

In accordance with operation 809, node 301-1 transmits the generated packet via telecommunications network 304. In accordance with an illustrative embodiment of the present invention, no identifier (e.g., network address, etc.) of any actor node is present in the generated packet. Notably, what this means is that each actor node will be monitoring not for its own identifier in each transmitted packet, but for relevant composite indications contained in the packets.

In some embodiments of the present invention, no identifier (e.g., network address, etc.) of the sensor node is present in the generated packet. Notably, this means that an actor node that detects and uses the packet does not know the identity of the transmitting sensor node, nor does it have to. Because of this, the transmitting sensor node does not expect an acknowledgment packet from the actor node; therefore, each transmitting sensor node might transmit the generated packet more than once in some embodiments, in order to improve the likelihood that the packet is detected and acted upon by the actor node.

After operation 809, control of execution returns to operation 803.

Concurrently with sensor node 301-1 operating in accordance with the operations described above, one or more physically distinct sensor nodes (e.g., sensor node 301-2, etc.) in addition to sensor node 301-1 can operate in accordance with the operations described above. In this way, multiple sensor nodes can be concurrently transmitting packets via network 304, and without any coordination of each other.

Figure 9:
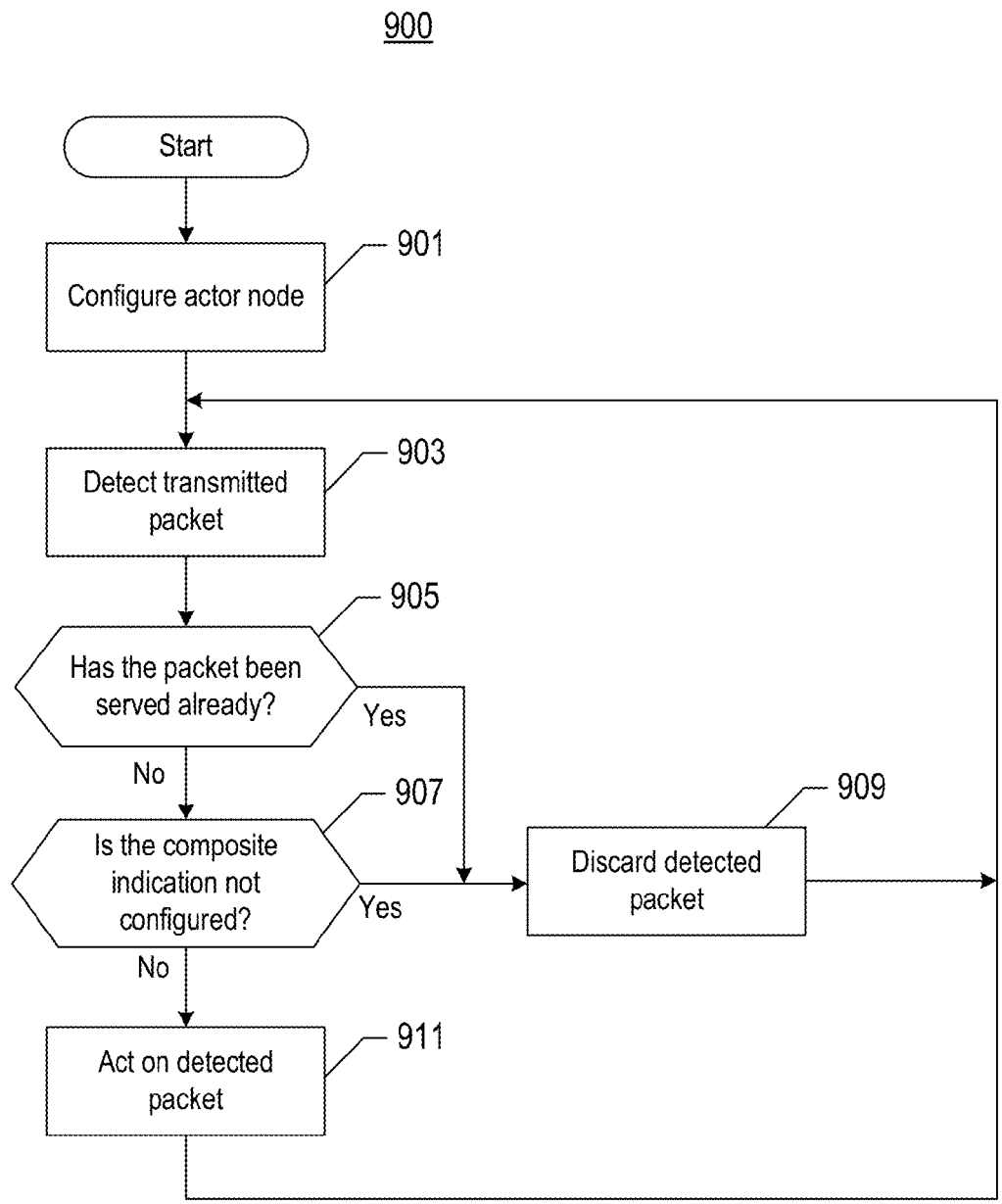
FIG. 9 depicts some salient operations of method 900, by which actor node 302-1 performs various actions.

Operations of Actor Node 302-n:

FIG. 9 depicts some salient operations of method 900 according to an illustrative embodiment of the present invention, by which representative actor node 302-1 performs various actions. In accordance with operation 901, actor node 302-1 is configured as described above and in FIG. 7. Then, the node enters a run-time mode.

Actor node 302-1 then begins monitoring transmitted packets for one or more tuples—a "tuple" as used herein being a non-empty, ordered list of elements—contained in the plurality of packets being transmitted by one or more sensor nodes. In accordance with operation 903 and as part of the ongoing monitoring, node 302-1 detects a transmitted packet containing a transmitted tuple.

In accordance with operation 905, node 302-1 determines whether it has already served the packet. If it has, control of execution proceeds to operation 909. If not, control of execution proceeds to operation 907. In some embodiments of the present invention, node 302-1 determines whether it has already served the packet by examining a timestamp contained in the packet and comparing the timestamp to an internal clock, thereby checking whether it has already seen this packet within a predetermined time interval.

In accordance with operation 907, node 302-1 determines whether the composite indication contained in the packet has been configured in its memory (i.e., as part of operation 901). If it has not been configured, control of execution proceeds to operation 909. If it has been configured, control of execution proceeds to operation 911.

In accordance with operation 909, node 302-1 discards the detected packet, taking no further action with the packet. Control of execution then returns to operation 903.

In accordance with operation 911, node 302-1 acts on the detected packet, as described below and in FIG. 10. Control of execution then returns to operation 903.

Concurrently with actor node 302-1 operating in accordance with the operations described above, one or more physically distinct actor nodes (e.g., actor node 302-2, etc.) in addition to actor node 302-1 can operate in accordance with the operations described above. In this way, multiple actor nodes can be concurrently monitoring for and detecting packets transmitted via network 304, from one or more sensor nodes and without any coordination of each other. Notably, multiple actor nodes might act on a particular packet, based in part on the composite indication contained in the packet being relevant to more than one actor node and possibly on additional composite indications having been indicated in previous packets, as discussed in detail below.

Figure 10:
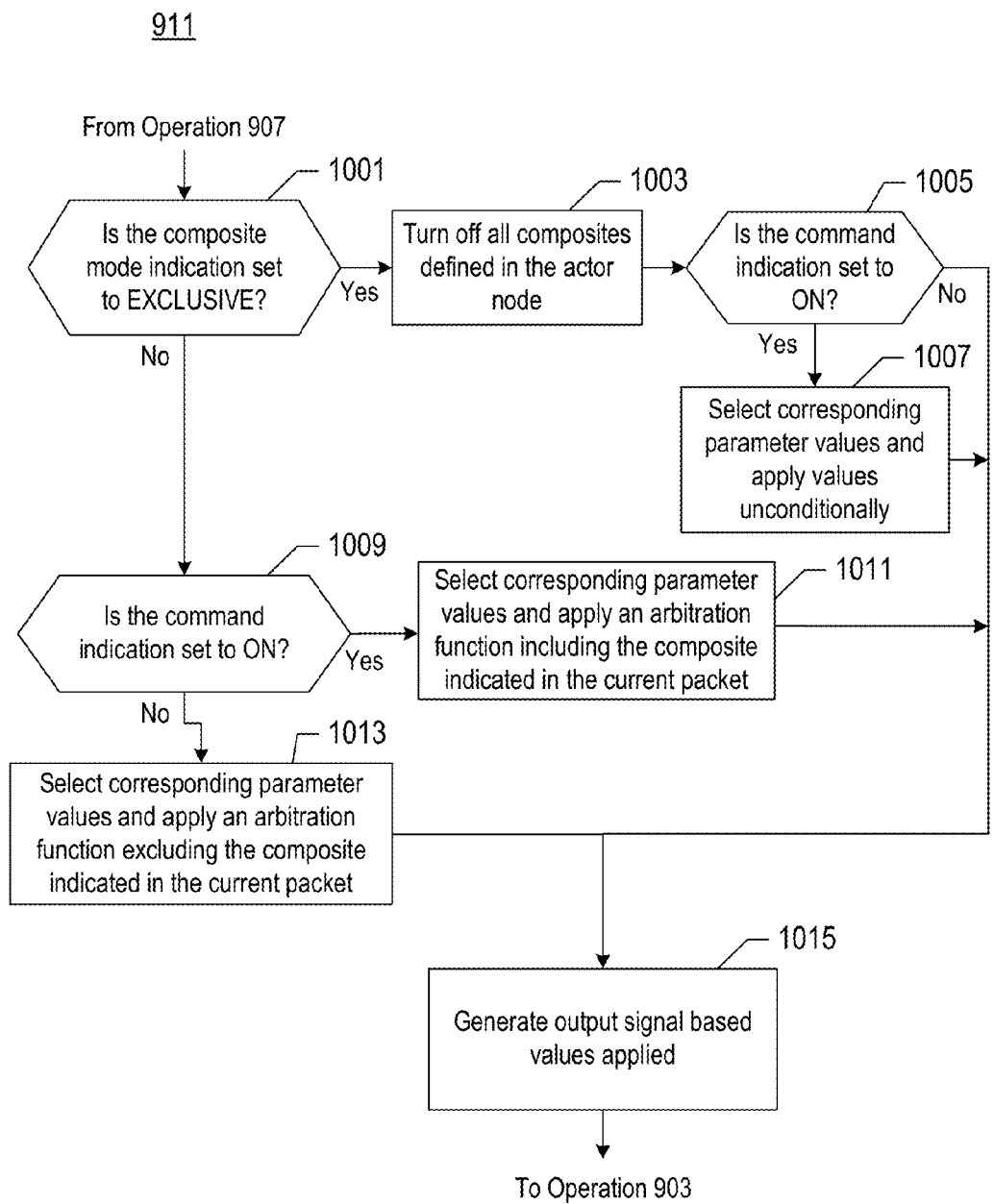
FIG. 10 depicts some salient operations of method 911, by which actor node 302-1 acts upon the detected data packet.

Acting on a Data Packet:

FIG. 10 depicts some salient operations of method 911, by which representative actor node 302-1 acts upon the detected data packet. In acting on a packet, node 302-1 performs one or more functions, such as an arbitration function discussed below and/or a function associated with actor unit 502-*k*, based on the composite indication value in the packet.

In accordance with operation 1001, actor node 302-1 determines whether the composite mode previously initialized in accordance with operation 901 has a value of "exclusive." If it has such a value, control of execution proceeds to operation 1003. If it does not, control of execution proceeds to operation 1009.

An actor node can act on more than one composite concurrently. Multiple composites are considered to be concurrently active at a particular actor node when the node has received packets from one or more sensor nodes, indicating the composites and with command indication values of "on". The "composite mode" determines whether a particular composite is "exclusive" or "coexisting." If the composite is identified as being exclusive, only the control value for that composite can be engaged at any given time. In contrast, if one or more composites are defined as being coexisting at a particular actor node, then the corresponding control values of those composites need to be considered in determining the control value to be applied, as discussed below and in accordance with operations 1009 through 1013.

In regard to the "exclusive" mode of operation, in accordance with operation 1003 node 302-1 turns off all composites that have been defined in the node.

In accordance with operation 1005, node 302-1 determines whether the command indication contained in the detected packet has a value of "on." If it has such a value, control of execution proceeds to operation 1007. If it does not, control of execution proceeds to operation 1015.

In accordance with operation 1007, node 302-1 selects the set of parameter values (i.e., composite mode, control value) corresponding to the composite indication contained in the packet. The node then applies these parameter values unconditionally. Control of execution then proceeds to operation 1015.

In accordance with operation 1009, in the case of the composite mode not having been set to "exclusive"—that is, the composite mode is instead set to "coexisting"-node 302-1 determines whether determines whether the command indication contained in the detected packet has a value of "on." If it has such a value, control of execution proceeds to operation 1011. If it does not, control of execution proceeds to operation 1013.

When a composite is has a mode value of "coexisting," the control value actually applied in controlling the actor node (i.e., the "applied control value") is a result of an arbitration function. The arbitration function determines the applied control value based on active inputs and, in some embodiments of the present invention, depends on the type of actor node. For example, the arbitration function of an analog lamp dimmer might be based on determining the maximum of two or more values; if multiple composites are active, with individual control values of 30%, 40%, and 70% brightness levels, the maximum is selected, resulting in the applied control value at the dimmer being the 70% brightness level. An implication of this is that if the dimmer node first receives a packet indicating composite 1 and has a stored control value for composite 1 of 70% and then receives a packet indicating composite 2 with a stored value of 40%, the dimmer node will maintain the 70% brightness level. In this case, only when the dimmer node detects that composite 1 (with 70% brightness) is turned off will the dimmer node apply the 40% brightness level, and only if that level is the maximum among all of the composites that are still active.

Other arbitration functions are possible. For example, for a window shade the arbitration function might apply the most recently-changed individual control value. The arbitration function of an air conditioner might be based on determining the minimum of two or more values; if multiple composites are active, with individual control values of 60° F. and 65° F. temperature levels, the minimum is selected, resulting in the applied control value at the air conditioner being the 60° F. temperature level.

In accordance with operation 1011 (i.e., command indication set to "on"), node 302-1 selects the individual control values of all coexisting composites that are currently active, including the control value of the composite indicated in the current packet. Node 302-1 then applies an arbitration function, as discussed above, in order to determine which control value to apply. Control of execution then proceeds to operation 1015.

In accordance with operation 1013 (i.e., command indication set to "off"), node 302-1 selects the individual control values of all coexisting composites that are currently active, excluding the control value of the composite indicated in the current packet because the composite is being deactivated based on the command indication being set to "off". Node 302-1 then applies an arbitration function, as discussed above, in order to determine which control value to apply. Control of execution then proceeds to operation 1015.

In accordance with operation 1015, node 302-1 generates an output signal to control one or more of actor units 502-1 through 502-K, based on the values applied in accordance with one of operations 1007, 1011, or 1013. For example, actor node 302-1 might dim a light to a predetermined level of brightness or raise the room temperature to a predetermined level of warmth, depending on the applied control value.

Figure 11:
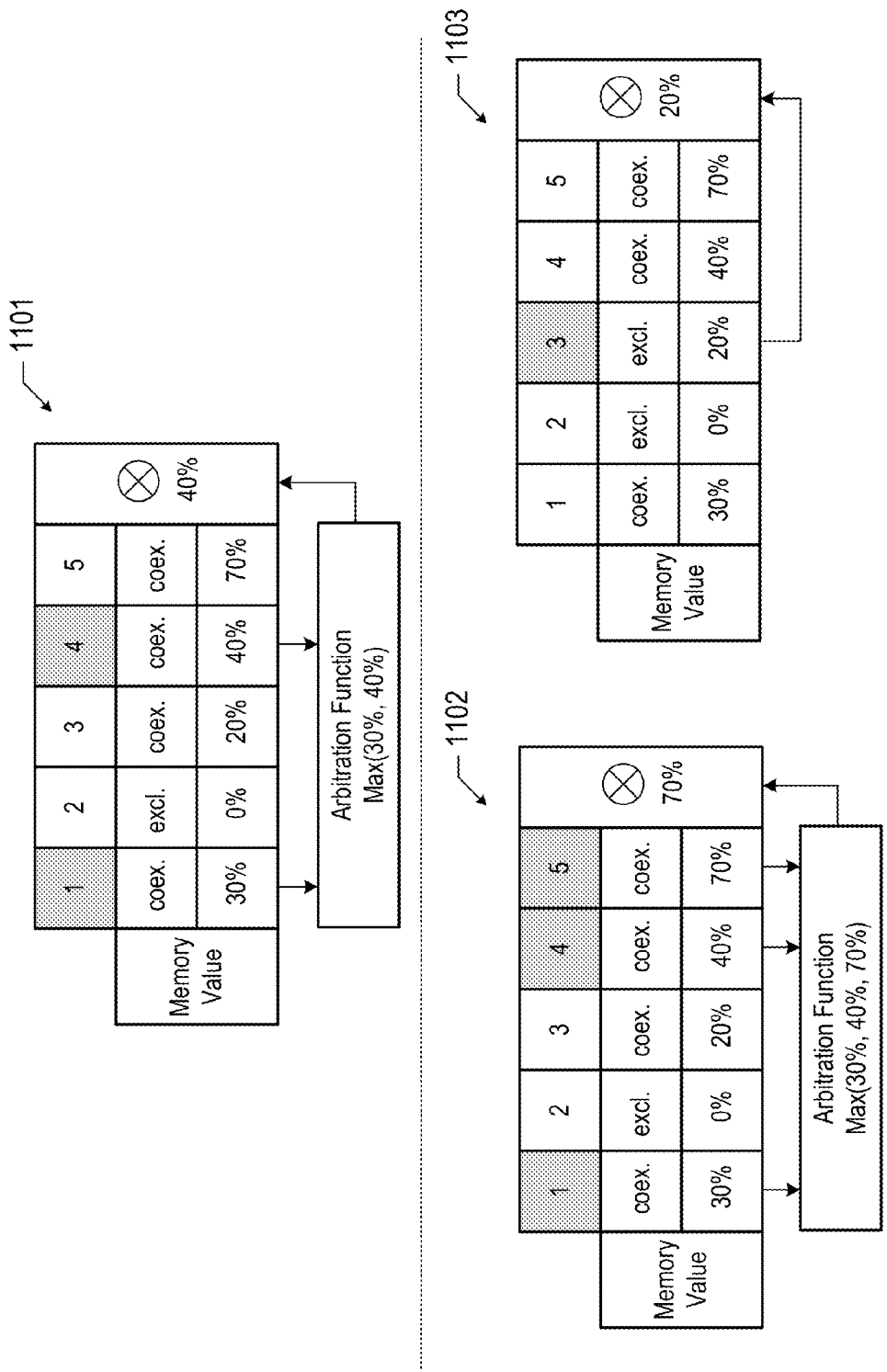
FIG. 11 depicts various, non-limiting examples of composite modes.

Examples of Composite Modes:

FIG. 11 depicts various, non-limiting examples of composite modes. Parameter set 1101 depicts a non-empty set of parameter values stored at actor node 302-1 for configurations 1 through 5. Actor node 302-1 constitutes a lamp whose brightness is controllable. Node 302-1 previously received a data packet containing a configuration indication value of "1" (shaded to denote a packet for which had been received), having a stored control value of 30% brightness. Node 302-1 also receives a data packet containing a configuration indication value of "4" (also shaded), having a stored control value of 40% brightness. Because the composite mode stored is "coexisting" (denoted as "coex"), actor node 302-1 knows to combine the multiple control values across composite indications 1 and 4, as in accordance with operation 1011. For example, node 302-1 might implement a "maximum" function as an arbitration function, in which the maximum of the values is applied; in this case, the 40% brightness value is applied and the corresponding output signal is generated to effect the change. As those who are skilled in the art will appreciate, after reading this specification, an actor node might implement another type of arbitration function than selecting the maximum value.

Continuing with the examples in FIG. 11, after having applied the parameter values in set 1101, actor node 302-1 might detect a data packet containing a composite indication value of "5", as indicated by the shading in parameter set 1102 and having a stored control value of 70% brightness. Because the composite mode stored is "coexisting" (denoted as "coex"), actor node 302-1 knows to combine the multiple control values across composite indications 1, 4, and now 5, as in accordance with operation 1011. Assuming the implemented maximum function, the 70% brightness value is applied and the corresponding output signal is generated to effect the change.

Alternatively, after having applied the parameter values in set 1101, actor node 302-1 might detect a data packet containing a composite indication value of "3", as indicated by the shading in parameter set 1103 and having a stored control value of 20% brightness. Because the composite mode stored for composite indication 3 is "exclusive" (denoted as "excl"), actor node 302-1 knows to apply only the parameter values for composite indication 3, as in accordance with operation 1007. As a result, the 20% brightness value is applied and the corresponding output signal is generated to effect the change.

Figure 12:
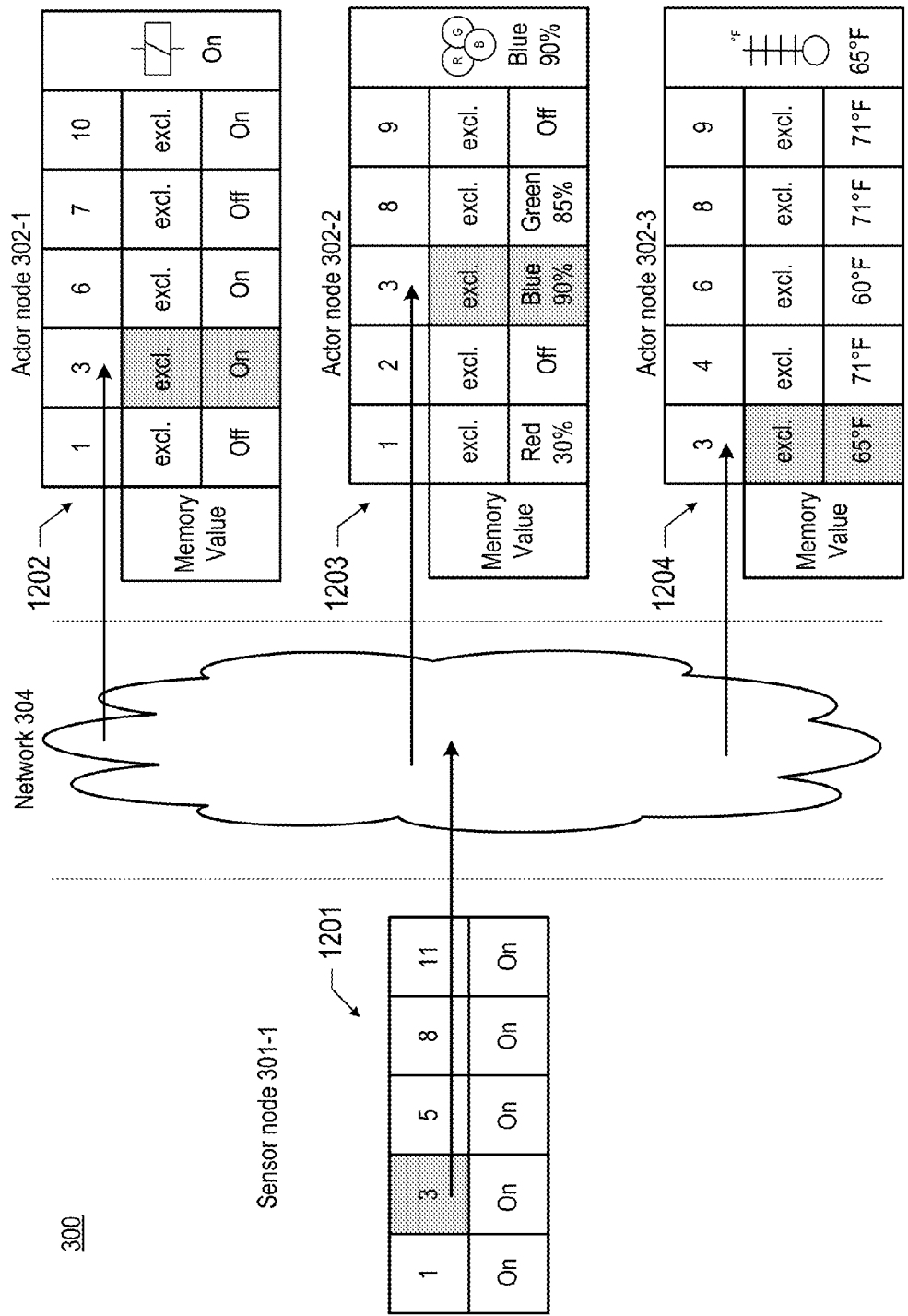
FIG. 12 depicts automation system 300 with a single sensor node and three actor nodes.
Figure 13:
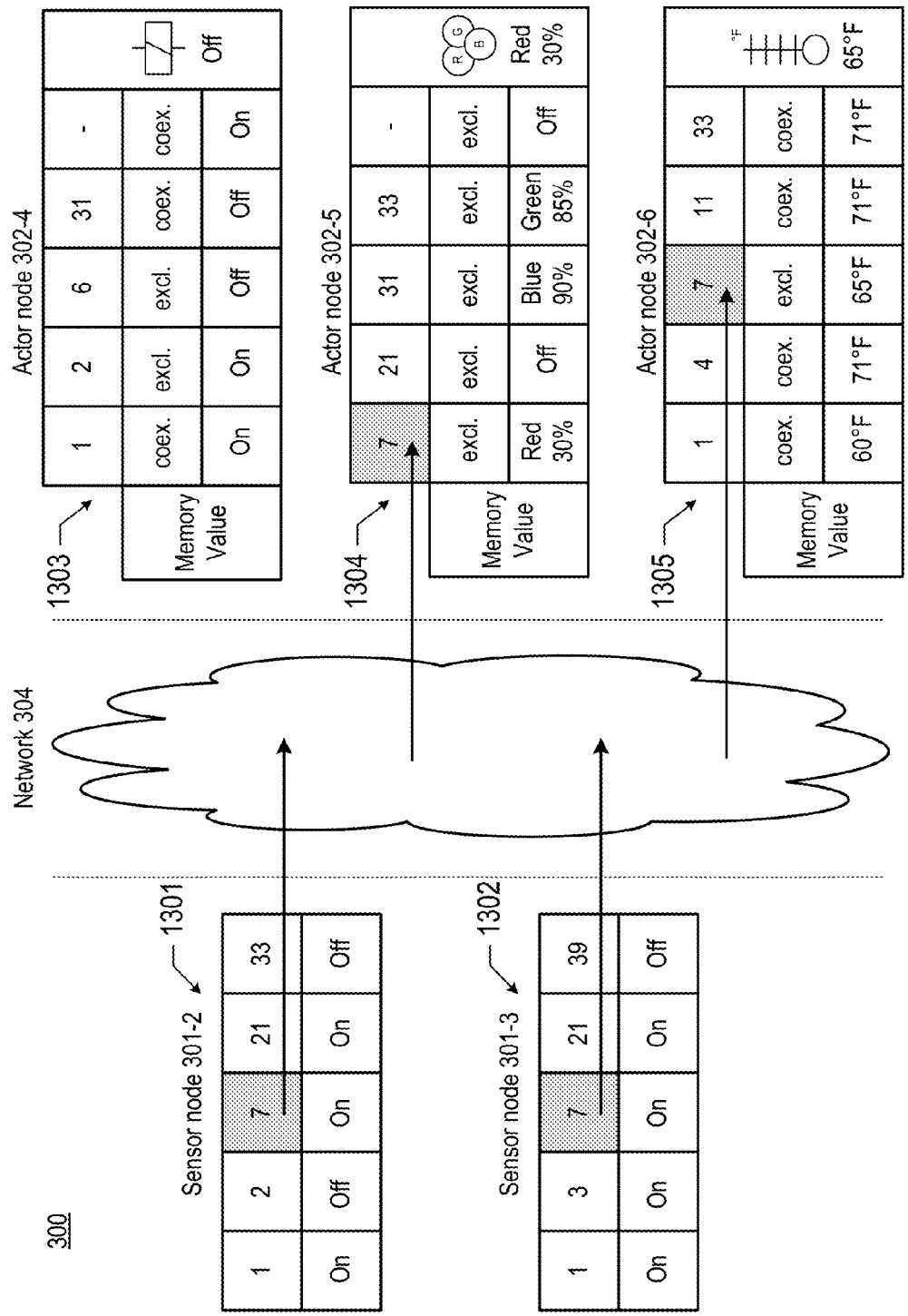
FIG. 13 depicts automation system 300 with two sensor nodes and three actor nodes.

Examples of Automation System 300:

FIG. 12 depicts a non-limiting example of automation system 300 with a single sensor node (i.e., node 301-1) and three actor nodes (i.e., nodes 302-1, 302-2, and 302-3). As depicted in parameter set 1201 and because it has been configured to do so, sensor node 301-1 is capable of generating and transmitting data packets for composites 1, 3, 5, 8, and 11, for simplicity all with a command indication value of "On." As those who are skilled in the art will appreciate, after reading this specification, the sensor node can be configured to generate and transmit packets for a different combination of composites, in any combination and for any total number of composites. Furthermore, the set of possible composites can vary from one sensor node to the next, as illustrated in FIG. 13. As denoted by the shading for the snapshot depicted, sensor node 301-1 generates and transmits into network 304 a data packet containing a composite indication value of "3."

Meanwhile, actor nodes 302-1 through 302-3 are monitoring for data packets transmitted in network 304. Because they have been configured to do so, actor node 302-1 will act on packets that contain configuration indications 1, 3, 6, 7, or 10; actor node 302-2 will act on packets that contain indications 1, 2, 3, 8, or 9; and actor node 302-3 will act on packets that contain indications 3, 4, 6, 8, or 9, as depicted. As those who are skilled in the art will appreciate, after reading this specification, each actor node can be configured to act on packets having a different set of composite indications, in any combination and for any total number of composite indications. Furthermore, the set of possible composites can vary from one actor node to the next.

All three actor nodes presently detect the packet containing configuration indication 3 and act on the packet accordingly. As depicted in parameter set 1202, actor node 302-1, a lamp switch of a first lamp, has a control value for configuration 3 of "On" and, as a result, generates a signal to turn the lamp on. As depicted in parameter set 1203, actor node 302-2, a lamp dimmer of a second lamp capable of color variation, has control values of "Blue, 90%" and, as a result, generates a signal to adjust the blue lighting component to 90% brightness. As depicted in parameter set 1204, actor node 302-3, a thermostat, has a control value of "65° F." and, as a result, generates a signal to change the temperature set point accordingly.

An end result associated with the illustrated example is that composite 3 is acted on concurrently and in aggregate by the three actor nodes. An intended effect is that the user of automation system 300 perceives that the first lamp, the second lamp, and the room temperature adjust in unison as part of the user-defined composite (e.g., scene, etc.) having been implemented. In accordance with the illustrative embodiment, however, this occurs without any direct communication or coordination between sensor node 301-1 and any of actor nodes 302-1 through 302-3, and without any direct communication or coordination among any of the actor nodes.

FIG. 13 depicts a non-limiting example of automation system 300 with two sensor nodes (i.e., nodes 301-2 and 301-3) and three actor nodes (i.e., nodes 302-4, 302-5, and 302-6). As depicted in parameter set 1301, sensor node 301-2 is capable of generating and transmitting data packets for composites 1, 2, 7, 21, and 33. As denoted by the shading for the snapshot depicted, sensor node 301-2 generates and transmits into network 304 a data packet containing a composite indication value of "7."

Meanwhile, as depicted in parameter set 1302, sensor node 301-3 is capable of generating and transmitting data packets for composites 1, 3, 7, 21, and 39. As denoted by the shading for the snapshot depicted, sensor node 301-3 generates and transmits into network 304 a data packet containing a composite indication value of "7."

Meanwhile, actor nodes 302-4 through 302-6 are monitoring for data packets transmitted in network 304. All three actor nodes detect each packet containing configuration indication 7 and act on (or discard) the packets accordingly. As depicted in parameter set 1303, actor node 302-4, a lamp switch of a first lamp, has no composite indication value of "7" stored and, as a result, discards the packet. As depicted in parameter set 1304, actor node 302-5, a lamp dimmer of a second lamp capable of color variation, has control values of "Red, 30%" and, as a result, generates a signal to adjust the red lighting component to 30% brightness. As depicted in parameter set 1205, actor node 302-6, a thermostat, has a control value of "65° F." and, as a result, generates a signal to change the temperature set point accordingly.

Similar to the previous example, an end result associated with the illustrated example is that composite 7 is acted on concurrently and in aggregate by the three actor nodes. In accordance with the illustrative embodiment, however, this occurs without any direct communication or coordination between sensor nodes 301-2 and 301-3 and any of actor nodes 302-4 through 302-6, without any direct communication or coordination between either of the sensor nodes, and without any direct communication or coordination among any of the actor nodes.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:
1. A method comprising:
    storing, by a first actor node, a first plurality of initialized tuples into a memory, each initialized tuple comprising a composite indication, wherein at least some of the composite indications in the first plurality are also stored into a memory by a second actor node that is physically distinct from the first actor node;

monitoring, by the first actor node, a plurality of wirelessly-transmitted packets for one or more tuples in the first plurality of initialized tuples, wherein the transmitted packets originate at one or more sensor nodes, and wherein each packet comprises a transmitted tuple;

discarding, by the first actor node, a packet in the plurality of transmitted packets being monitored, as a result of the transmitted tuple in the packet corresponding to a tuple that has been already acted upon by the first actor node; and acting, by the first actor node, on the transmitted tuple in a packet that is undiscarded by the first actor node; wherein the acting occurs without the first actor node being addressed by and without the first actor node addressing the second actor node or the one or more sensor nodes.

2. The method of claim 1 further comprising discarding a packet in the plurality of transmitted packets, as a result of the composite indication in the packet not having been stored by the first actor node as part of the storing.

3. The method of claim 1 wherein the acting comprises generating an output signal based on a composite indication in the transmitted packet.

4. The method of claim 3 wherein each initialized tuple further comprises an initialized mode indication, and wherein the output signal is further based on the initialized mode indication that corresponds to the composite indication in the transmitted packet.

5. The method of claim 4 wherein, depending on the corresponding initialized mode indication, the output signal is further based on a command indication in a second packet that has been acted upon before the transmitted packet.

6. The method of claim 1 wherein no identifier of the node that transmitted the undiscarded packet, is present in the packet undiscarded by the first actor node.

7. The method of claim 1 further comprising:
storing, by the second actor node, a second plurality of initialized tuples, wherein a first composite indication is present in both the first and second pluralities; and
acting, by the second actor node, on the transmitted tuple in a packet that is undiscarded by the second actor node.

8. The method of claim 7 wherein the transmitted tuple in the packet undiscarded by the second actor node comprises a second composite indication that is absent from the first plurality of initialized tuples.

9. The method of claim 7 further comprising:
transmitting, by a first source node, a first non-empty set of packets that constitutes the plurality of transmitted packets, wherein the first non-empty set comprises at least one packet comprising the first composite indication.

10. The method of claim 9 further comprising:
transmitting, by a second source node, a second non-empty set of packets that constitutes the plurality of transmitted packets, wherein the second source node is physically distinct from the first source node.

11. The method of claim 7 further comprising:
receiving a first tuple, by the first actor node from a configuring node, wherein the first plurality of initialized tuples comprises the first tuple; and
receiving a second tuple, by the second actor node from the configuring node, wherein the second plurality of initialized tuples comprises the second tuple;
wherein the first and second tuples comprise the same composite indication.

12. A method comprising:
transmitting, by a configuring node, a first tuple to a first actor node and a second tuple to a second actor node, wherein each of the first and second tuple comprises a composite indication;
storing, by the first actor node, a first plurality of initialized tuples comprising the first tuple;
storing, by the second actor node, a second plurality of initialized tuples comprising the second tuple;
monitoring, by the first and second actor nodes, a plurality of wirelessly-transmitted packets, wherein the transmitted packets originate at one or more sensor nodes, and wherein each packet comprises a transmitted tuple;
discarding, by at least one of the first and second actor nodes, one or more packets in the plurality of transmitted packets, as a result of the transmitted tuples in the one or more packets corresponding to tuples that have been already acted upon by the corresponding first or second actor node performing the discarding; and
acting, by the first actor node, on the transmitted tuple in a packet that is undiscarded by the first actor node; wherein the acting occurs without the first actor node being addressed by and without the first actor node addressing the second actor node or the one or more sensor nodes.

13. The method of claim 12 further comprising acting, by the second actor node, on the transmitted tuple of a packet that is undiscarded by the second actor node.

14. The method of claim 13 wherein the packet that is undiscarded by the first actor node and the packet that is undiscarded by the second actor node are the same.

15. The method of claim 13 wherein the packet that is undiscarded by the first actor node and the packet that is undiscarded by the second actor node are different.

16. A system comprising a first actor node, the first actor node comprising:
a memory configured to store a first plurality of initialized tuples, each initialized tuple comprising a composite indication, wherein at least some of the composite indications in the first plurality are also stored in a memory of a second actor node that is physically distinct from the first actor node;
a receiver configured to monitor a plurality of wirelessly-transmitted packets for one or more tuples in the first plurality of initialized tuples, wherein the transmitted packets originate at one or more sensor nodes, and wherein each packet comprises a transmitted tuple; and
a processor configured to:
i) discard a packet in the plurality of transmitted packets being monitored, as a result of the transmitted tuple in the packet corresponding to a tuple that has been already acted upon by the first actor node, and
ii) act on the transmitted tuple in a packet that is undiscarded by the first actor node, without the first actor node being addressed by and without the first actor node addressing the second actor node or the one or more sensor nodes.

17. The system of claim 16 wherein the processor is further configured to discard a packet in the plurality of transmitted packets, as a result of the composite indication in the packet not having been stored by the first actor node in the memory.

18. The system of claim 16 wherein the processor is configured to act by generating an output signal based on a composite indication in the transmitted packet.

19. The system of claim 18 wherein each initialized tuple further comprises an initialized mode indication, and wherein the output signal is further based on the initialized mode indication that corresponds to the composite indication in the transmitted packet.

20. The system of claim 19 wherein, depending on the corresponding initialized mode indication, the output signal is further based on a command indication in a second packet that has been acted upon before the transmitted packet.

21. The system of claim 16 wherein no identifier of the node that transmitted the undiscarded packet, is present in the packet undiscarded by the first actor node.

22. The system of claim 16 further comprising a second actor node, the second actor node comprising:
   a memory configured to store a second plurality of initialized tuples, wherein a first composite indication is present in both the first and second pluralities; and
   a processor configured to act on the transmitted tuple in a packet that is undiscarded by the second actor node.

23. The system of claim 22 wherein the transmitted tuple in the packet undiscarded by the second actor node comprises a second composite indication that is absent from the first plurality of initialized tuples.

24. The system of claim 22 further comprising a first source node, the first source node comprising:
   a transmitter configured to transmit a first non-empty set of packets that constitutes the plurality of transmitted packets, wherein the first non-empty set comprises at least one packet comprising the first composite indication.

25. The system of claim 24 further comprising a second source node, the second source node comprising:
   a transmitter configured to transmit a second non-empty set of packets that constitutes the plurality of transmitted packets, wherein the second source node is physically distinct from the first source node.

26. The system of claim 22 wherein:
   the first actor node is further configured to receive a first tuple from a configuring node, wherein the first plurality of initialized tuples comprises the first tuple; and
   the second actor node is further configured to receive a second tuple from the configuring node, wherein the second plurality of initialized tuples comprises the second tuple;

wherein the first and second tuples comprise the same composite indication.

27. A system comprising:
a configuring node configured to transmit a first tuple to a first actor node and a second tuple to a second actor node, wherein each of the first and second tuple comprises a composite indication;
the first actor node, configured to store a first plurality of initialized tuples comprising the first tuple;
the second actor node, configured to store a second plurality of initialized tuples comprising the second tuple;
wherein the first and second actor nodes are each configured to monitor a plurality of wirelessly-transmitted packets, wherein the transmitted packets originate at one or more sensor nodes, and wherein each packet comprises a transmitted tuple;
wherein at least one of the first and second actor nodes is configured to discard one or more packets in the plurality of transmitted packets, as a result of the transmitted tuples in the one or more packets corresponding to tuples that have been already acted upon by the corresponding first or second actor node performing the discarding; and
wherein the first actor node is configured to act on the transmitted tuple in a packet that is undiscarded by the first actor node, without the first actor node being addressed by and without the first actor node addressing the second actor node or the one or more sensor nodes.

28. The system of claim 27 wherein the second actor node is configured to act on the transmitted tuple of a packet that is undiscarded by the second actor node.

29. The system of claim 28 wherein the packet that is undiscarded by the first actor node and the packet that is undiscarded by the second actor node are the same.

30. The system of claim 28 wherein the packet that is undiscarded by the first actor node and the packet that is undiscarded by the second actor node are different.

\* \* \* \* \*